United States Patent
Park (10) Patent No.: US 12,435,826 B2
(45) Date of Patent: Oct. 7, 2025

(54) PIPE BINDING MECHANISM

(71) Applicant: Myeong Su Park, Seoul (KR)

(72) Inventor: Myeong Su Park, Seoul (KR)

(*) Notice: Subject to any disclaimer, the term of this patent is extended or adjusted under 35 U.S.C. 154(b) by 0 days.

(21) Appl. No.: 18/912,084

(22) Filed: Oct. 10, 2024

(65) Prior Publication Data

US 2025/0137567 A1 May 1, 2025

(30) Foreign Application Priority Data

Oct. 30, 2023 (KR) .......................... 10-2023-0146385

(51) Int. Cl.
*F16L 47/20* (2006.01)

(52) U.S. Cl.
CPC .................................... *F16L 47/20* (2013.01)

(58) Field of Classification Search
CPC . F16L 47/06; F16L 47/20; F16L 47/12; F16L 55/17; F16L 55/1705; F16L 55/172; F16L 55/1725; F16L 21/002; F16L 21/005; F16L 21/06; F16L 25/01; F16L 25/04; F16L 27/10; F16L 27/1017; F16L 27/1025; F16L 27/113; F16L 27/1133
See application file for complete search history.

(56) References Cited

U.S. PATENT DOCUMENTS 8,651,532 B2 * 2/2014 Felber .................... F16L 25/14

FOREIGN PATENT DOCUMENTS

KR 10-2522327 B1 4/2023

* cited by examiner

*Primary Examiner* — Aaron M Dunwoody
(74) *Attorney, Agent, or Firm* — Bridgeway IP Law Group, PLLC; Jihun Kim (57) ABSTRACT

A pipe binding mechanism, which connects a first pipe and a second pipe, both made of a synthetic resin material, may include: a rubber band which is formed in a ring shape penetrated longitudinally and is made of a flexible material capable of being in close contact with the outer surfaces of the first and second pipes; a tightening plate which is made of an elastic metallic material, formed to wrap connected ends of the first and second pipes in the circumferential direction, and configured for both ends to overlap each other and to wrap the rubber band from the outside; and a pair of pipe binding bands which are respectively arranged at both widthwise ends of the tightening plate and configured to adjust the close contact force relative to the outer surfaces of the first and second pipes.

6 Claims, 7 Drawing Sheets

FIG. 1

Prior Art

PIPE BINDING MECHANISM

CROSS-REFERENCE TO RELATED APPLICATIONS

The present application claims priority to Korean Patent Application No. No. 10-2023-0146385, filed Oct. 30, 2023, the entire contents of which are incorporated herein for all purposes by this reference.

BACKGROUND OF THE INVENTION

Field of the Invention

The present invention relates to a pipe binding mechanism which can facilitate the connection of a pair of pipes and rapidly perform repair/replacement work when necessary.

Background Art

In general, sewage pipes or wastewater pipes made of synthetic resin material are installed by continuously connecting unit lengths of pipes. The pipes are used by connecting connected ends of the pipes without leakage during initial piping or when repairing partial damages.

One of conventional methods of connecting the ends of pipes is a method that a rubber tube for preventing the water leak is inserted into the circumference of connection ends of two pipes, which will be connected, from the outside and a semicylindrical or cylindrical clamp is coupled and fastened on the outside to connect the connection ends of the pipes without the water leak.

Through the conventional method, it is expected to prevent the water leak through the rubber tube by coupling and fastening the rubber tube, which is inserted into the circumference of connection ends of two pipes, which will be connected, with the clamp.

However, the conventional pipe binding mechanism merely connects a pair of pipes by pressing the outer surfaces of the pipes through the rubber tube, and does not employ a structure that is directly connected to the pipes.

As a means to overcome the above problem, Korean Patent No. 10-2522327 (hereafter, conventional art) has been disclosed.

Figure 1:
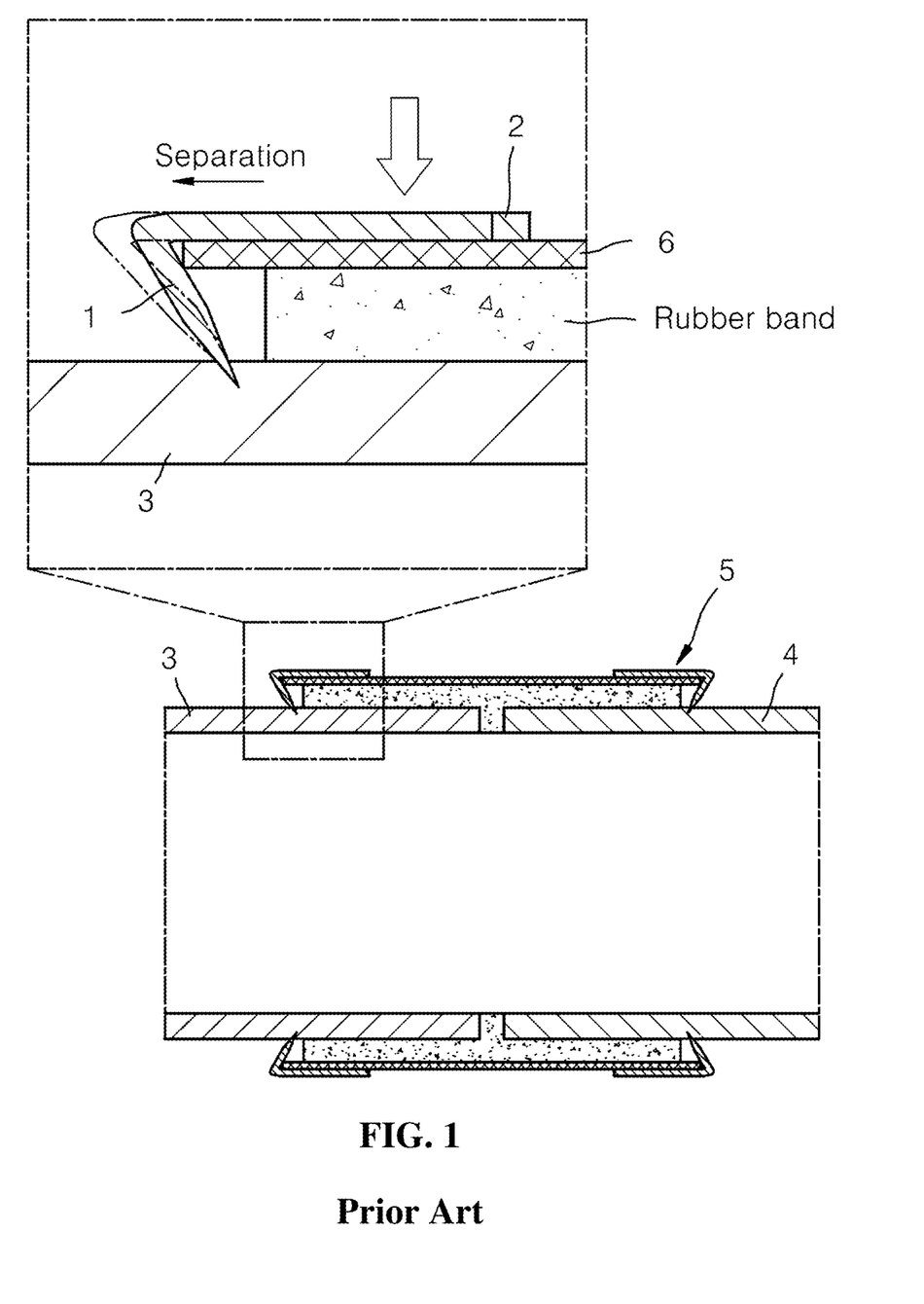
FIG. 1 is a view illustrating a state in which a force is applied in the direction in which pipe binding bands are separated by being pushed outward, in a pipe binding mechanism according to a conventional art.

According to the content disclosed in the conventional art, pipe binding bands 5 are provided, including a pressure pin 1 and a band body 2, and the pressure pin 1 is provided to be inclined relative to the band body 2 and is inserted into first and second pipes in the inclined direction. When pressure force is provided in a direction that the first and second pipes 3 and 4 approach each other, as illustrated in FIG. 1, a reactive force occurs, thus causing power that the pair of pipe binding bands are respectively separated from a tightening plate 6 to the outside. So, the pipe binding bands can be separated from the tightening plate. To prevent the separation, in the conventional art, a retaining hole and a retaining piece are respectively provided to the tightening plate 6 and the pipe binding bands, thus preventing the pipe binding bands from being separated from the tightening plate 6 during a binding process of the pipe binding bands.

However, the conventional art requires a molding process to form the retaining hole and the retaining piece to the tightening plate and the pipe binding bands and a process to assemble by coupling the retaining pieces of the pipe binding bands and the retaining holes of the tightening plate. So, the conventional art is complicated in the overall assembly process and increases the product cost.

Moreover, the conventional art includes a plurality of pressure pins formed at one end of a band body and respectively bents relative to the band body, thus forming the pipe binding bands. For example, the band body and the plurality of pressure pins are formed and bent through a press mold. That is, in the conventional art, the band body and the plurality of pressure pins have the same thickness, so it has been impossible to increase the thickness of the band body to maintain the flexible characteristics of the band body and to increase the thickness of the pressure pins beyond a predetermined thickness limit. Due to the thickness limitation, the conventional art has a limitation in increasing the stiffness of the pressure pins beyond a predetermined level.

Furthermore, in the conventional technology, the plurality of pressure pins are formed only at each end of the pair of pipe binding bands. So, when the circumferential positions of the pressure pins of the pair of pipe binding bands are aligned, the binding force of the pipe binding band acts as a horizontal force on the tightening plate.

That is, a virtual second plane including a virtual straight line connecting a pair of facing pressure pins of the pair of pipe binding bands must be parallel to a virtual first plane passing through the axial center of the tightening plate so that the binding force of the pipe binding bands acts as the horizontal force.

However, it is difficult to align the pressure pins of the pair of pipe binding bands in the circumferential direction, and if the pressure pins of the pair of pipe binding bands are not aligned in the circumferential direction, the force acting on the first and second pipes from the pair of pressure pins during the binding of the pipe binding bands will include not only the horizontal force but also a rotational moment. In such cases, the position of the pipe binding mechanism may be changed, and the binding force connecting the first and second pipes may also be weakened.

PATENT LITERATURE

Patent Documents

Patent Document 1: Korean Patent No. 10-2522327 (granted on Apr. 12, 2023)

SUMMARY OF THE INVENTION

Accordingly, the present invention has been made to solve the above-mentioned problems occurring in the prior arts, and it is an objective of the present invention to provide a pipe binding mechanism, which does not require interlocking means such as retaining holes and retaining pieces between pipe binding bands and a tightening plate, thereby simplifying an assembly process and reducing a product cost.

It is another objective of the present invention is to provide a pipe binding mechanism, which increases the rigidity of pressure pins compared to the conventional art, thereby improving the pipe binding force.

It is another objective of the present invention is to provide a pipe binding mechanism, which can provide sufficient pipe binding force without specifically considering the orientation of a pair of pipe binding bands during the process of arranging and coupling the pipe binding bands to the tightening plate.

To accomplish the above object, according to the present invention, there is provided a pipe binding mechanism, which connects a first pipe and a second pipe, both made of a synthetic resin material, including: a rubber band which is formed in a ring shape penetrated longitudinally and is made of a flexible material capable of being in close contact with the outer surfaces of the first and second pipes; a tightening plate which is made of an elastic metallic material, formed to wrap connected ends of the first and second pipes in the circumferential direction, and configured for both ends to overlap each other and to wrap the rubber band from the outside; and a pair of pipe binding bands which are respectively arranged at both widthwise ends of the tightening plate and configured to adjust the close contact force relative to the outer surfaces of the first and second pipes, wherein a plurality of rubber band pressure pins spaced from each other in a circumferential direction are coupled to the rubber band, both longitudinal ends of the plurality of rubber band pressure pins are bent to be in contact with the outer surface of the first and second pipes and are bend inclinedly in the direction that the first and second pipes approach each other.

The rubber band pressure pins are made of a metallic material, and each includes: a pressure pin body extending long in a length direction of the rubber band; and a pair of pressure pin protrusions inclinedly bent at an both longitudinal ends of the pressure pin body to be in contact with the outer surfaces of the first and second pipes.

The rubber band includes: inclined surfaces which are formed at both ends thereof inclinedly to correspond to the inclination angle of the pressure pin protrusions and to be in surface contact with the pressure pin protrusions; and a body insertion groove recessed to accommodate the pressure pin body being pressed in.

The pair of pressure pin protrusions are arranged such that an angle of less than 90 degrees is formed between the pressure pin protrusions and the pressure pin body.

The pipe binding band is formed to be freely detachable from the tightening plate.

The pipe binding band is arranged to wrap the tightening plate in the circumferential direction without being fastened through any fastening means, such as welding, hooks, locking holes, bolts, or rivets, relative to the tightening plate.

The thickness of the rubber band pressure pin is greater than the thickness of the band body of the pipe binding band.

The pipe binding mechanism according to the present invention does not need the process of assembling the pipe binding bands and the tightening plate using the retaining holes and the retaining pieces since not requiring to form the retaining holes and the retaining pieces on the tightening plate and the pipe binding bands, thereby simplifying an assembly process and reducing a product cost.

Furthermore, the pipe binding mechanism maintains the thickness of the pipe binding bands like the conventional art to easily compress the rubber band through the pipe binding bands, and substantially makes the rubber band pressure pins, which transmit pressure force to the first and second pipes, thicker than the pipe binding bands to increase the stiffness of the pressure pin protrusions, thereby increasing the pipe binding force.

Moreover, the pipe binding mechanism according to the present invention does not need to arrange the pressure pins (conventional art) provided at one end of the pair of pipe binding bands in the same position in the circumferential direction of the rubber band, but can prevent the change in position of the pipe binding mechanism through binding force only by the horizontal force of the rubber band pressure pins, thus increasing the binding force.

Furthermore, the pipe binding mechanism according to the present invention can provide sufficient pipe binding force without specifically considering the orientation of the pipe binding bands during the process of arranging and coupling the pair of pipe binding bands relative to the tightening plate, thereby allowing a worker to quickly perform the installation.

In addition, the pipe binding mechanism according to the present invention can assemble the rubber band and the rubber band pressure pins not to be easily separated just by the force to press the rubber band pressure pin into the body insertion groove formed in the rubber band made of rubber material, thereby simplifying the assembly process and eliminating the need for fastening members or adhesives for combining the rubber band pressure pin and the rubber band.

DETAILED DESCRIPTION OF THE PREFERRED EMBODIMENT

Hereinafter, embodiments of the present invention will be described in more detail with reference to the accompanying drawings. However, the present invention is not limited to the embodiments disclosed herein, but may be implemented in various different forms, and the embodiments are provided to make the present disclosure complete and to let those skilled in the art fully know the scope of the present invention. The same reference numerals denote the same elements throughout the drawings.

A pipe binding mechanism according to a preferred embodiment of the present invention has a structure to be fixed integrally with a pair of pipes when the pipes are connected with each other, thus preventing the pipe from being pushed out and detached by the flow pressure of high-pressure water when an external force is applied to the pipes or when high-pressure waterwork is performed due to the blockage of the inside of the pipe. In addition, the pipe binding mechanism according to a preferred embodiment of the present invention can provide pressure force to the pipes such that the pair of pipes move in the direction to approach each other during the process of being tightly coupled to the pipes to connect the pair of pipes, thereby providing more reliable leakage prevention.

Moreover, the pipe binding mechanism according to the present invention prevents the generation of force that pipe binding bands move in the direction to be detached outward during the process of tightening the pipe binding bands, and does not need to form interlocking means, such as retaining holes and retaining pieces, between pipe binding bands and a tightening plate, thereby simplifying an assembly process and reducing a product cost.

Furthermore, the pipe binding mechanism maintains the thickness of the pipe binding bands like the conventional art and substantially makes pressure pins, which transmit pressure force to the pipes, thicker than the pipe binding bands, to increase the stiffness of the pressure pins, thereby increasing the pipe binding force.

In addition, the pipe binding mechanism according to the present invention can provide sufficient pipe binding force without specifically considering the orientation of the pipe binding bands during the process of arranging and coupling the pair of pipe binding bands relative to the tightening plate, thereby allowing a worker to quickly perform the installation.

Hereinafter, the present invention will be described in detail with reference to embodiments.

As illustrated in FIGS. 2 to 5, a pipe binding mechanism 1000 according to an embodiment of the present invention is to connect a first pipe 10 and a second pipe 20 made of synthetic resin material, and includes a rubber band 100, a tightening plate 200, and pipe binding bands 300.

Here, the first pipe 10 and the second pipe 20 are made of a synthetic resin material having a predetermined degree of ductility, such as PVC, and the like.

The pipe binding mechanism 1000 according to an embodiment of the present invention can be installed at various connection points connecting a plurality of pipes. For convenience of description and illustration, the present invention will be described based on the connection of the first pipe 10 and the second pipe 20, which are formed in a straight pipe form.

A rubber band 100 is formed in a ring shape and is made of a material such as rubber with sufficient ductility to ensure close contact with the exterior of the pipes. Furthermore, as illustrated in FIGS. 2 to 5, the rubber band 100 is formed in a ring shape penetrated internally in the length direction and made of a flexible material to ensure it can closely fit onto the outer surfaces of the first and second pipes 10 and 20. Additionally, a contact ring part 110 are provided on the inner circumferential surface of the rubber band 100, so that ends of the first and second pipes 10 and 20 are respectively in contact with the inner circumferential surface of the rubber band 100.

The worker inserts the end of the first pipe 10 into an opening of one side of the rubber band 100 and the end of the second pipe 20 into an opening of the other side of the rubber band, such that the rubber band 100 temporarily connects the first and second pipes.

The rubber band 100 having a predetermined ductility comes into close contact with the outer surfaces of the first and second pipes 10 and 20, thus preventing leaks through a gap between the connected pipes to a predetermined extent.

The tightening plate 200 is formed in a shape to wrap around the outside of the rubber band 100 and is combined on the exterior of the rubber band 100. The tightening plate 200 is made of a metallic material having a predetermined elasticity, is formed to wrap around the connected ends of the first and second pipes 10 and 20 in the circumferential direction in such a way that both end portions of the tightening plate 200 can overlap each other. That is, the tightening plate 200 is formed in a shape where a thin flat plate is rolled into a circular form and both end portions thereof overlap each other, but are not connected integrally through bonding, welding or other methods. A band body, which will be described later, is also formed in a shape of a thin flat plate rolled into a circular form.

Therefore, the tightening plate 200 is changed in shape to be tightly wound through the robust fastening force of the pipe binding band 300 described later. Through the shape change of the tightening plate, the rubber band 100 is further compressed by the tightening plate 200, allowing for closer contact to the first and second pipes. When the rubber band 100 is compressed, if the initial thickness of the rubber band is a, the thickness of the rubber band after the compression maintains b smaller than a (see FIGS. 6 and 7).

During the compression of the rubber band 100, the end of the rubber band pressure pins 400, which will be described later, can provide pressure towards the first and second pipes 10 and 20 while moving deeper in the thickness direction, thereby moving the first and second pipes toward each other. A more detailed description of the above will be described later.

The pipe binding band 300 is arranged on the tightening plate 200, and in this instance, is designed to be freely detachable from the tightening plate 200.

Furthermore, the pipe binding band 300 is placed simply wrapping the tightening plate 200 in the circumferential direction, not fixed through any fixing means like welding, hooks, locking holes, bolts, or rivets. In such a state, when the worker rotates the adjustment member 310 to one side, the pipe binding band 300 can be tightened and the entire pipe binding band can be closely attached to the circumferential direction of the tightening plate 200, resulting in the rubber band 100 being further compressed.

As described above, the pipe binding mechanism according to the present invention does not require any structure/method, such as welding, hooks, locking holes, bolts, and rivets for binding the tightening plate and the pipe binding bands, thereby reducing manufacturing costs and enhancing productivity due to the omission of processes.

In addition, the pipe binding mechanism according to the present invention includes pressure pin protrusions 420 formed at both ends of the rubber band pressure pin 400 inserted into a body insertion groove 150 of the rubber band 100 to provide pressure force in the direction that the first and second pipes approach each other, thus preventing the generation of force that the pipe binding bands move outwards even if the pipe binding bands 300 are tightened. Therefore, the pipe binding mechanism according to the present invention does not need to form retaining holes and retaining pieces on the pipe binding bands and the tightening plate, thereby eliminating the process of assembling the pipe binding bands 300 and the tightening plate 200 using the retaining holes and the retaining pieces and reducing a product cost.

The tightening plate 200 is installed in a manner to wrap around the rubber band 100 to entirely cover the outer surface of the rubber band 100. When the worker adjusts the binding force of an adjustment member 310, the tightening plate 200 presses the rubber band so that the rubber band 100 comes into close contact with the outer surfaces of the first pipe 10 and the second pipe 20 while the overlapping ends of the tightening plate 200 are tightened. As described above, the rubber band 100 gets in close contact with the outer surfaces of the pipes, thus preventing leakage.

Figure 6:
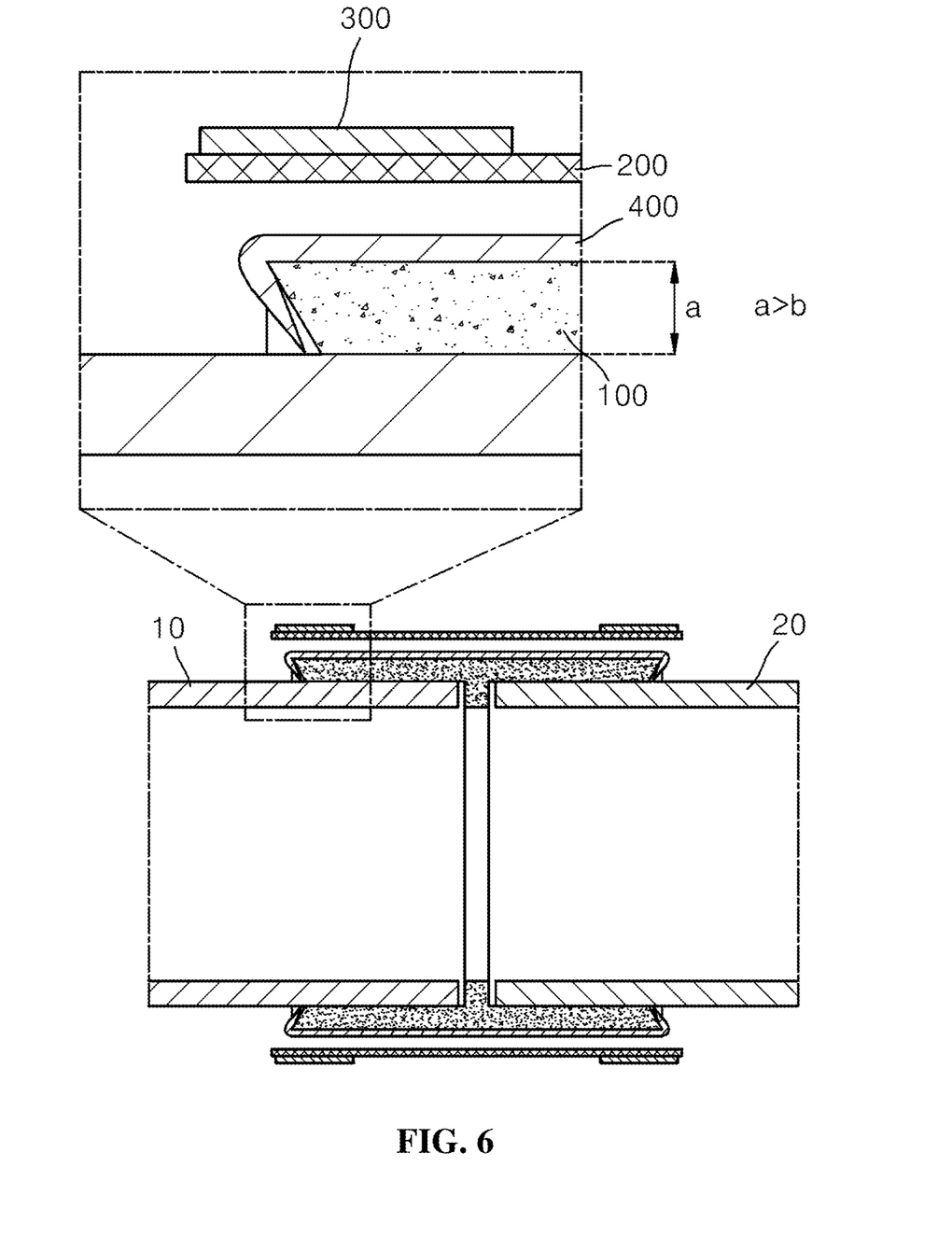
FIGS. 6 and 7 are views sequentially illustrating the process of tightly connecting a pair of pipes using the pipe binding mechanism according to an embodiment of the present invention.
Figure 7:
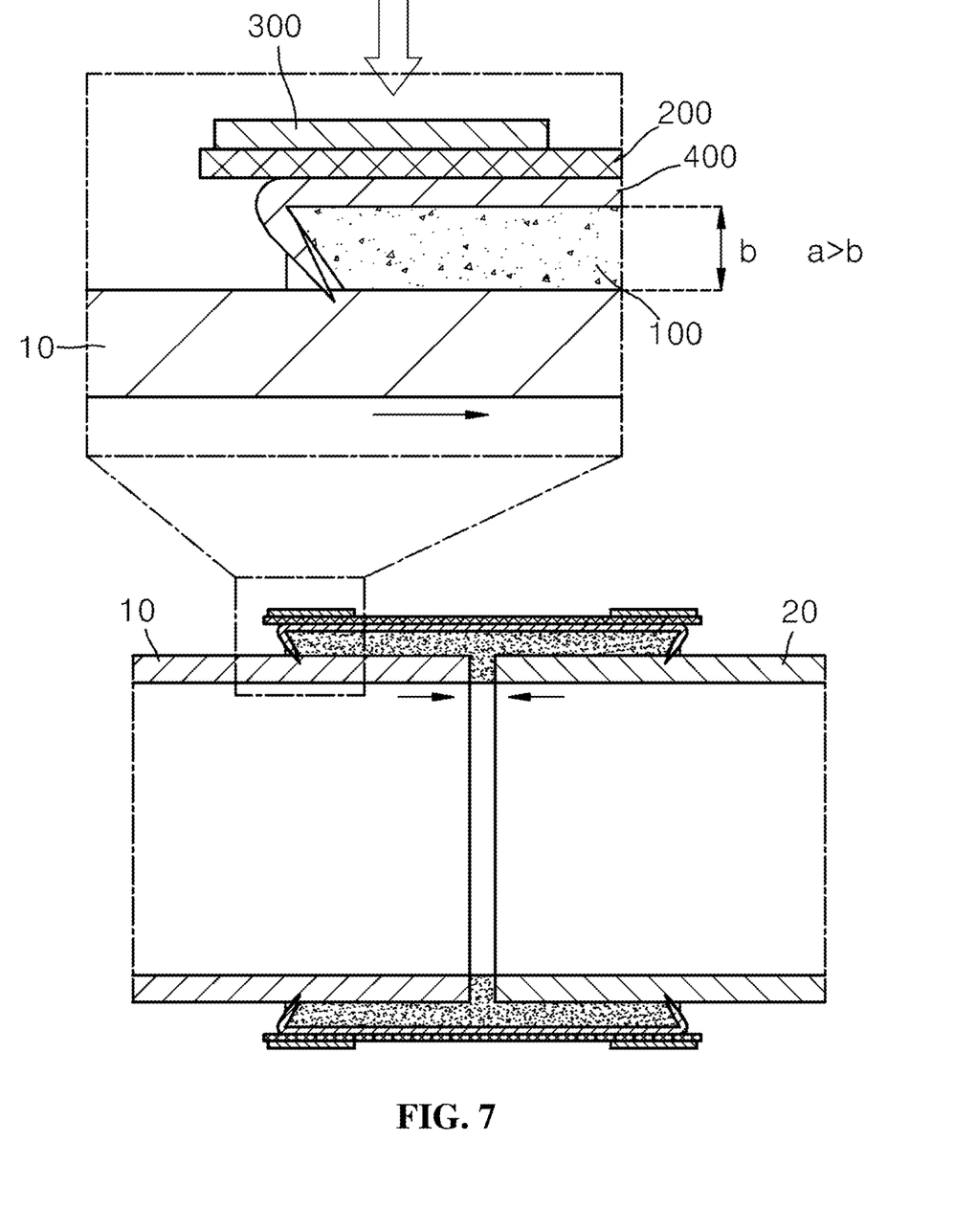

As illustrated in FIGS. 6 and 7, it is preferable for the width of the tightening plate 200 to be larger than the width of the rubber band 100, so that when the band body 320 is tightly clamped by the adjustment member 310, the pressure applied to the tightening plate is sufficiently transferred to the rubber band pressure pins 400, allowing the pressure pin protrusions 420 to be easily inserted into the first and second pipes 10 and 20.

Figure 2:
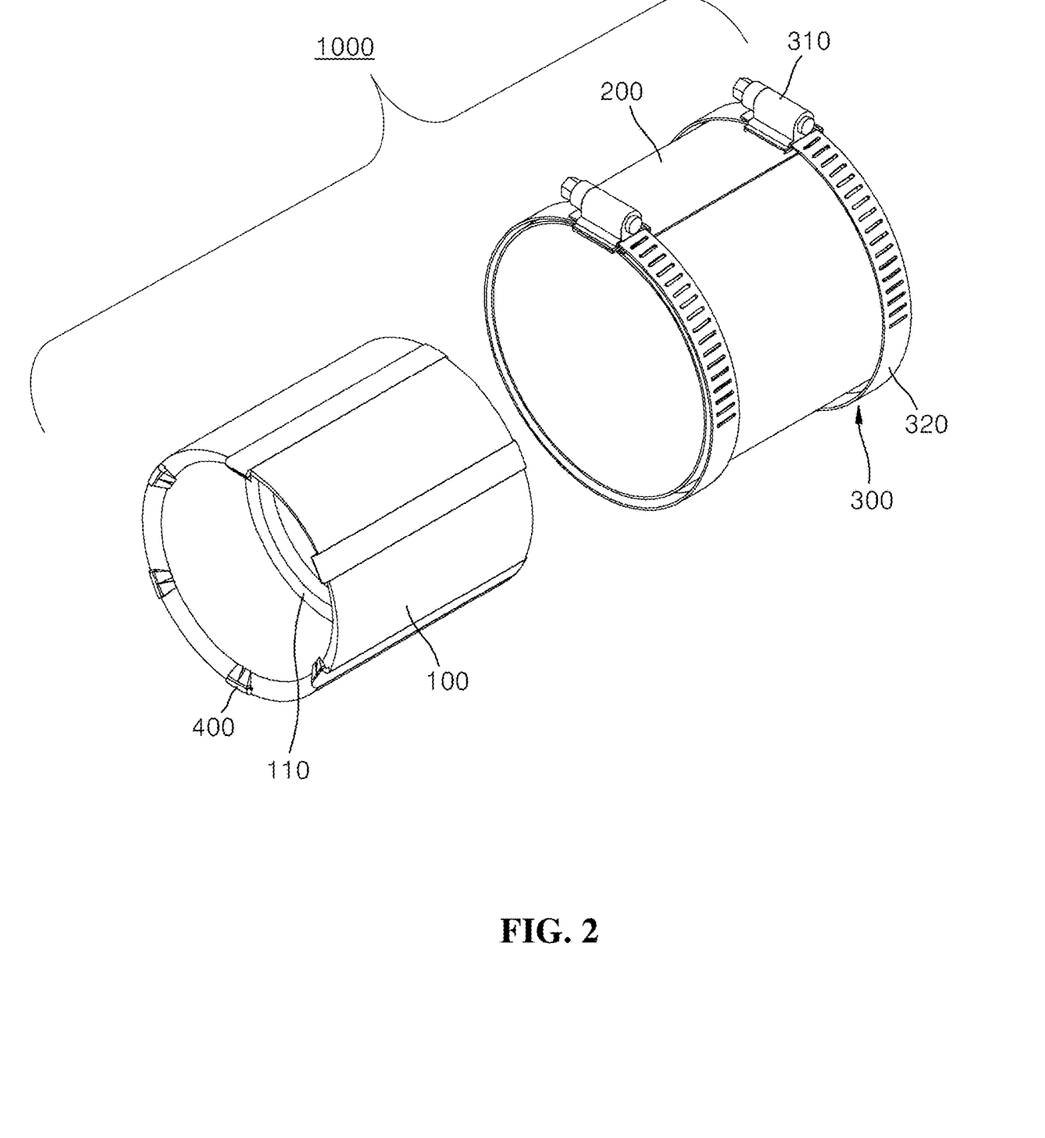
FIG. 2 is a perspective view of a pipe binding mechanism according to an embodiment of the present invention.
Figure 3:
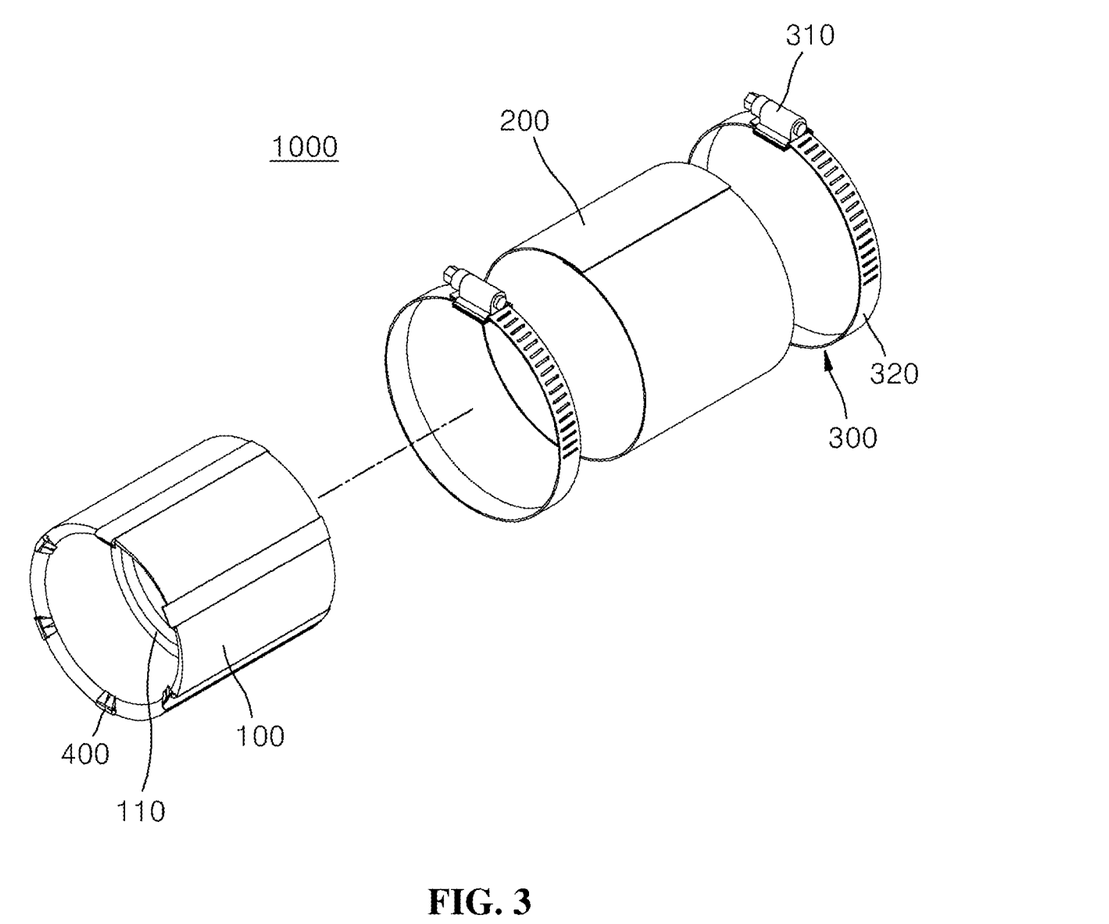
FIGS. 3 and 4 are exploded perspective views of the pipe binding mechanism according to an embodiment of the present invention.

Next, as illustrated in FIGS. 2 and 3, the pipe binding bands 300 are respectively positioned on both width-directional ends of the tightening plate 200, and is freely detachable from the tightening plate 200, specifically not fixed through any means such as welding, hooks, locking holes, bolts, or rivets but simply arranged to wrap the tightening plate 200 in the circumferential direction.

Therefore, as described above, the pipe binding mechanism according to the present invention does not require any structure/method, such as welding, hooks, locking holes, bolts, or rivets, for interconnecting the tightening plate and the pipe binding bands, thereby reducing manufacturing costs due to elimination of processes, and improving productivity.

Here, the binding force generated while adjusting the pair of pipe binding bands 300 with the adjustment member 310 is stably transmitted only to the rubber band pressure pins 400, allowing the positioning on the tightening plate 200 to be unrestricted.

As illustrated in FIGS. 2, 3, 6, and 7, the pipe binding bands 300 are designed to allow the adjustment of binding force to the outer surfaces of the first and second pipes 10 and 20 through the adjustment member 310.

In an embodiment of the present invention, the pipe binding band 300 includes a band body 320 formed from a thin metal plate rolled into a circular shape, and the adjustment member 310 which controls the rolled level of the band body 320 which is rolled tightly or loosely.

The band body 320 is formed in a ring-shape to wrap the connected ends of the first and second pipes 10 and 20 in the circumferential direction, and has a structure that allows for the adjustment of binding force to the outer surfaces of the first and second pipes 10 and 20 through the adjustment member 310.

In addition, if the adjustment member 310 is rotated further in one direction, the band body 320 is further tightened and further compresses the rubber band 100 more. Due to the compression, the thickness of the rubber band 100 becomes smaller than the initial thickness thereof, and the rubber band 100 gets in more close contact with the outer surfaces of the first and second pipes 10 and 20. At this point, the pressure pin protrusions 420 of the rubber band pressure pin 400, which are coupled to the rubber band 100, move deeper into the interior of the first and second pipes 10 and 20, applying pressure to move the first and second pipes 10 and 20 towards each other.

Here, the adjustment member 310 adopts a threaded coupling structure to adjust the length of the band body 320 by rotating the adjustment member using a tool such as a screwdriver or wrench, and has a conventional structure.

As the pipe binding band 300 is tightly clamped, the tightening plate 200 is tightened and compresses the rubber band 100 in the thickness direction. Accordingly, as illustrated in FIGS. 6 and 7, the sharp pressure pin protrusions 420 of the rubber band pressure pin 400 coupled to the rubber band 100 provides pressure to the first and second pipes 10 and 20 to move them closer to each other while penetrating into the first and second pipes.

As such, as illustrated in FIG. 7, as the first pipe 10 and the second pipe 20 move towards each other, the end of the first pipe 10 can be in close contact with one side of a contact ring part 110 of the rubber band 100, and the end of the second pipe 20 can be in close contact with the other side of the contact ring part. The close contact structure of the pipe ends can prevent sewage flowing along the first and second pipes from leaking through the gap between the contact ring part 110 and the ends of the first and second pipes 10 and 20, and through the gap between the inner surface of the rubber band 100 and the outer surfaces of the first and second pipes 10 and 20.

Additionally, since a fluid has the characteristic of penetrating into a small gap when the small gap is formed. So, the present invention effectively blocks the formation of gaps between the contact ring part 110 and the ends of the first and second pipes 10 and 20, thereby reliably preventing the fluid from leaking externally through the gap between the inner surface of the rubber band 100 and the outer surfaces of the first and second pipes.

Moreover, in the state in which the rubber band 100 is coupled to the ends of the first and second pipes, it may be difficult for the worker to visually confirm whether the ends of the first and second pipes are in close contact with the contact ring part 110. However, using the present invention, the worker can perform work such that the ends of the pipes can be in firmly contact with the contact ring part 110 through the pressure force of the rubber band pressure pin 400.

As illustrated in FIGS. 2 to 5, a plurality of rubber band pressure pins 400 are coupled to the rubber band 100 to be spaced apart from each other in the circumferential direction.

The plurality of rubber band pressure pins 400 are made of a metallic material and are formed long in the length direction where the first and second pipes 10 and 20 are connected, namely, in the length direction of the rubber band 100.

Here, the longitudinal ends of the plurality of rubber band pressure pins 400 are bent so that they are capable of being in contact with the outer surfaces of the first and second pipes 10 and 20, each being bent to be inclined in the direction that the first pipe 10 and the second pipe 20 approach each other.

That is, the left end of the rubber band pressure pin 400 positioned on the left side in the drawing is bent to the right, and the right end of the rubber band pressure pin positioned on the right side in the drawing is bent to the left.

Figure 4:
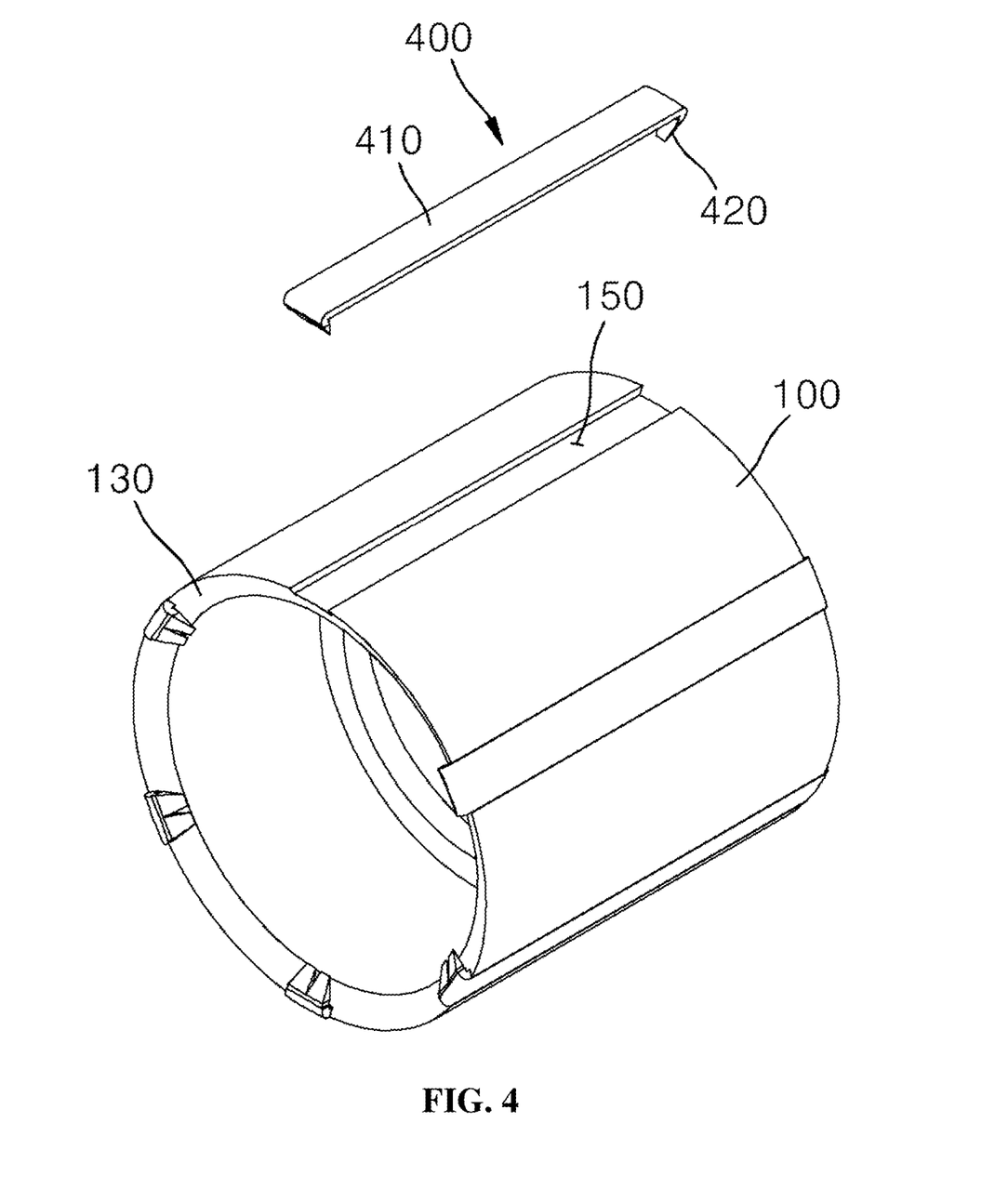
Figure 5:
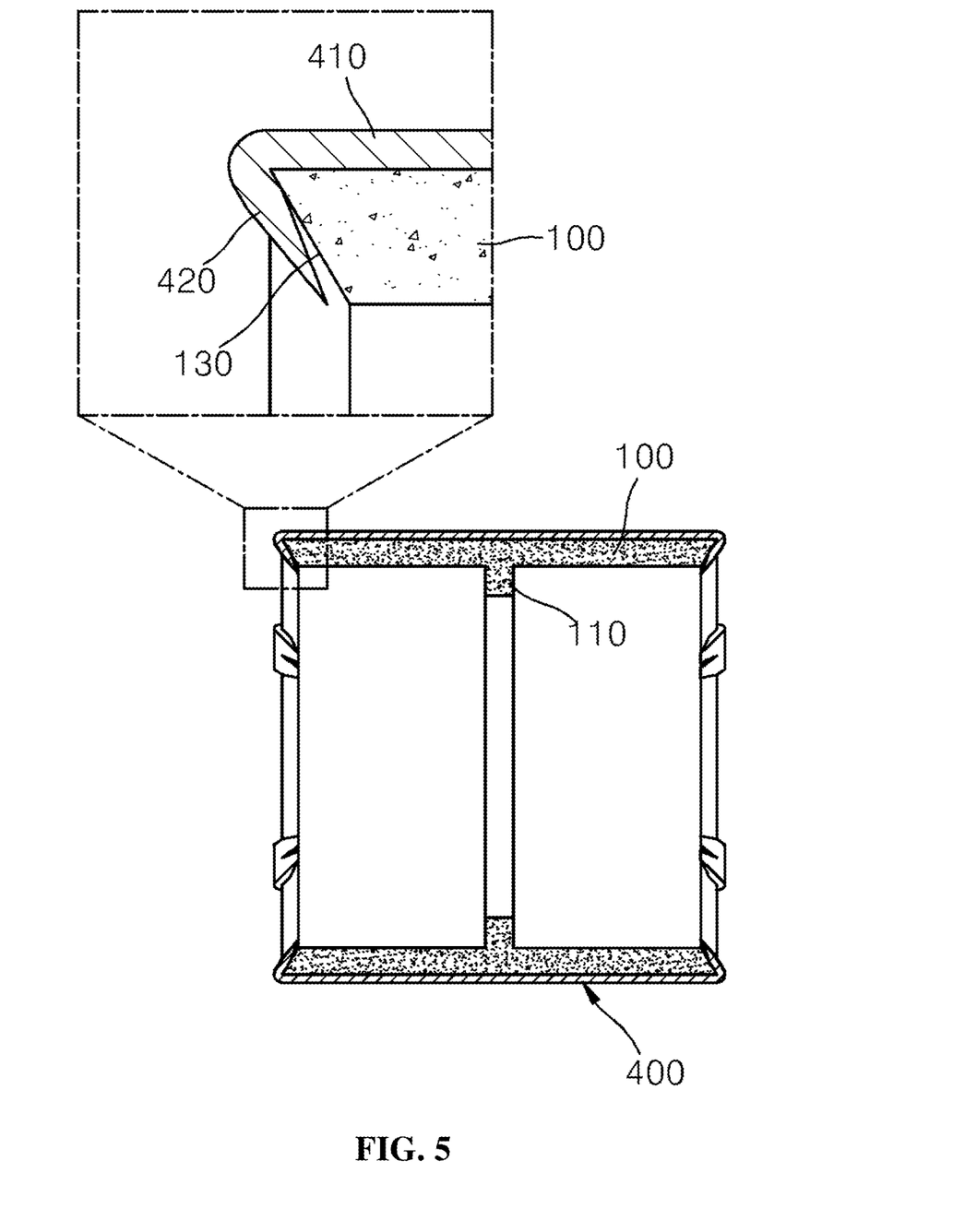
FIG. 5 is a cross-sectional view illustrating a combined state of a rubber band and rubber band pressure pins in the pipe binding mechanism according to an embodiment of the present invention.

In an embodiment of the present invention, as illustrated in FIG. 4, each of the rubber band pressure pins 400 is made of a metallic material with higher stiffness than the first and second pipes, and includes a pressure pin body 410 and a pair of pressure pin protrusions 420.

The pressure pin body 410 has a predetermined length and can be coupled to the rubber band to extend long in the length direction of the rubber band 100.

The pair of pressure pin protrusions 420 have sharp ends, and are respectively bent to be inclined at both longitudinal ends of the pressure pin body 410 to be in contact with the outer surfaces of the first and second pipes 10 and 20. Here, the angle between the pressure pin protrusions 420 and the pressure pin body 410 can be formed to be less than 90 degrees.

Through the inclined and bent structure of the pressure pin protrusions 420, while the worker rotates the adjustment member 310 to gradually tighten the band body 320 against the tightening plate 200 and increase the close pressing power, as illustrated in FIG. 7, the sharp bending ends of the pressure pin protrusions 420 can be inserted in an inclined direction towards thicker parts of the first and second pipes 10 and 20.

When the pressure pin protrusions 420 are inserted into the first and second pipes in the inclined direction, movement pressure is provided to the first and second pipes so that the first pipe and the second pipe move towards each other. Additionally, unlike the conventional art, there is no counterforce acting outwardly on the pipe binding band 300, eliminating the risk of detachment.

Here, during the fastening work of the band body 320, as the angle between the pressure pin protrusions 420 and the pressure pin body 410 decreases, the pressure pin protrusions 420 are inserted into the thicker parts of the first and second pipes.

Due to the structure where the pressure pin protrusions 420 are inserted into the thicker parts of the first and second pipes and coupled integrally with the first and second pipes, the pipe binding mechanism according to the present invention can maintain the integrated state of the pipe binding band 300, the first pipe 10, and the second pipe 20, thereby preventing the pipes from being pushed out and detached by the flow pressure when external forces are applied to the pipes or when sewage/wastewater flows at high pressure, and providing excellent seismic performance.

Furthermore, the pipe binding mechanism according to the present invention can the pipes located at the rear, based on the flow direction of sewage/wastewater from being detached from the pipe binding band 300.

In addition, since the connected ends of the first and second pipes are not fixed through bonding or other methods, if repair/replacement of the first pipe 10 and the second pipe 20 is necessary, it is easy to detach the pipe binding bands 300 from the pipes by releasing the fastening between the pipe binding band 300 and the pipes, replace the first or/and second pipe with new ones, and then perform the re-fastening of the pipe binding band 300, thereby making repair and replacement operations much easier.

Inclined surfaces 130 are provided at both ends of the rubber band 100 to be inclined corresponding to the inclination angle of the pressure pin protrusions 420 and to be in surface contact with the pressure pin protrusions.

Additionally, a body insertion groove 150 is recessed in the rubber band 100 to accommodate the pressure pin body 410. The rubber band is made of rubber material, and the rubber band pressure pin 400 is made of metallic material. So, due to the elastic characteristics of the rubber material, the rubber band pressure pins 400 can maintain a stable bonded state, and do not move in the circumferential direction of the rubber band due to the body insertion groove 150 but can stably maintain the fixed and fastened state at a set position.

In the state in which the pressure pin body 410 is inserted and coupled in the body insertion groove 150, the pressure pin body 410 does not protrude from the outer circumferential surface of the rubber band 100 but continuously extends to the outer circumferential surface of the rubber band, thereby providing a smoothly connected state.

Since the body insertion groove 150 is formed on the rubber band 100 made of the rubber material and the rubber band pressure pins 400 are press-fit to the body insertion groove 150, the rubber band pressure pins 400 can be assembled to the rubber band not to be easily separated just by the power pressing the rubber band pressure pins 400 to the body insertion groove 150, thereby simplifying the assembly process and eliminating the need for additional fasteners or adhesives to combine the rubber band pressure pins 400 and the rubber band 100.

In an embodiment of the present invention, during the tightening of the pipe binding band 300, the rubber band pressure pins 400 penetrate into the thicker parts of the first and second pipes while providing pressure to move the first and second pipes towards each other.

In addition, as illustrated in FIG. 6, before tightening of the pipe binding band 300, the pressure pin protrusions 420 of the rubber band pressure pins 400 coupled to the rubber band 100 do not penetrate into the thicker parts of the first and second pipes 10 and 20. However, as illustrated in FIG. 7, when the pipe binding bands are tightly coupled, the rubber band 100 is compressed to become thinner, and consequently, the pressure pin protrusions 420 penetrate inclinedly into the thicker parts of the first and second pipes 10 and 20 so that the first and second pipes approach each other.

That is, the present invention provides pressure that causes the first and second pipes 10 and 20 to move towards each other while the pressure pin protrusions 420 penetrate inclinedly into the thicker parts of the first and second pipes 10 and 20.

Meanwhile, the band body 320 has a thin thickness to be easily bent and to allow the worker to adjust the bent degree. The pipe binding mechanism according to the present invention can maintain the thickness of the pipe binding bands 300 like the convention art and substantially make the thickness of the rubber band pressure pins 400, which transmit pressure to the first and second pipes 10 and 20, greater than the thickness of the pipe binding bands 300 to increase the stiffness of the pressure pin protrusions 420, thereby increasing the pipe binding force.

In addition, in an embodiment of the present invention, the thickness of the rubber band pressure pins 400 is made larger than the thickness of the band bodies 320 of the pipe binding bands 300, thereby preventing the pressure pin protrusions 420 from being bent or broken while the pressure pin protrusions 420 provide pressure force while penetrating through the first and second pipes, and increasing the pipe binding force by maximizing the pressure force to the first and second pipes.

That is, due to the pressure pin protrusions 420 formed at both ends of the rubber band pressure pin 400, the pipe binding mechanism of the present invention can increase the thickness of the pressure pin protrusions 420 while maintaining the thin state of the band bodies 320 of the pipe binding bands 300, thereby enhancing the stiffness of the rubber band pressure pins 400.

Furthermore, since the pressure pin protrusions 420 are formed at both ends of the straight pressure pin body 410, the pressure pin protrusions 420 located at both ends of the rubber band 100 are arranged in the same location in the circumferential direction of the rubber band. Accordingly, compared to Korean Patent No. 10-2522327, the pipe binding mechanism of the present invention does not need for arranging the pressure pins (conventional art) provided at one end of the pair of pipe binding bands in the same location in the circumferential direction of the rubber band, namely, for adjusting the position while rotating the pipe binding bands in the circumferential direction of the rubber band, in the state in which the pipe binding bands are not fixed and coupled to the tightening plate through the retaining pieces and the retaining holes, and is not changed in position of the pipe binding mechanism and increases the binding force since the binding force is acted just by the horizontal force of the rubber band pressure pin 400.

While the present invention has been described in connection with the preferred embodiments for illustrating the principle of the present invention, the present invention is not limited to the configuration and actions described in the specific embodiments. It will be appreciated to those skilled in the art that the present invention can be changed and modified in various manners without departing from the spirit and scope of the present invention.

What is claimed is:

1. A pipe binding mechanism, which connects a first pipe and a second pipe, both made of a synthetic resin material, comprising:
    a rubber band which is formed in a ring shape penetrated longitudinally and is made of a flexible material capable of being in close contact with outer surfaces of the first and second pipes;
    a tightening plate which is made of an elastic metallic material, configured to wrap connected ends of the first and second pipes in a circumferential direction and to wrap the rubber band from outside, and having both ends overlapping each other; and
    a pair of pipe binding bands which are respectively disposed at both widthwise ends of the tightening plate and configured to adjust a close contact force relative to the outer surfaces of the first and second pipes; and
    a plurality of rubber band pressure pins made of a metallic material, each comprising:
    a pressure pin body extending in a longitudinal direction of the rubber band; and
    a pair of pressure pin protrusions having both longitudinal ends inclinedly bent to be in contact with the outer surfaces of the first and second pipes,
    wherein the plurality of rubber band pressure pins are spaced from each other in a circumferential direction and coupled to the rubber band, and both longitudinal ends of the plurality of rubber band pressure pins are inclinedly bent in a direction that the first and second pipes approach each other.

2. The pipe binding mechanism according to claim 1, wherein the rubber band includes inclined surfaces defined at both ends thereof to correspond to an inclination angle of the pressure pin protrusions and to be in surface contact with the pressure pin protrusions, and a body insertion groove recessed to accommodate the pressure pin body being pressed in.

3. The pipe binding mechanism according to claim 1, wherein an angle of less than 90 degrees is defined between the pressure pin protrusions and the pressure pin body.

4. The pipe binding mechanism according to claim 1, wherein each of the pair of pipe binding bands is formed to be freely detachable from the tightening plate.

5. The pipe binding mechanism according to claim 1, wherein each of the pair of pipe binding bands is arranged to wrap the tightening plate in the circumferential direction without being fastened through any fastening means, such as welding, hooks, locking holes, bolts, or rivets, relative to the tightening plate.

6. The pipe binding mechanism according to claim 1, wherein a thickness of each of the plurality of rubber band pressure pins is greater than a thickness of a band body of each of the pair of pipe binding bands.

* * * * *